United States Patent
Mundra et al.

(10) Patent No.: US 6,742,988 B2
(45) Date of Patent: Jun. 1, 2004

(54) COMPOSITE TUBULAR WOVEN SEAL FOR STEAM TURBINE DIAPHRAGM HORIZONTAL JOINT INTERFACES

(75) Inventors: Kamlesh Mundra, Clifton Park, NY (US); John Cao, Scotia, NY (US); Daniel R. Predmore, Ballston Lake, NY (US); Abdul-Azeez Mohammed-Fakir, Guilderland, NY (US); Gene Palmer, Clifton Park, NY (US); Jonathan Munshi, Scotia, NY (US)

(73) Assignee: General Electric Company, Schenectady, NY (US)

( * ) Notice: Subject to any disclaimer, the term of this patent is extended or adjusted under 35 U.S.C. 154(b) by 28 days.

(21) Appl. No.: 10/283,200

(22) Filed: Oct. 30, 2002

(65) Prior Publication Data

US 2004/0086384 A1 May 6, 2004

(51) Int. Cl.[7] ................................ F01D 9/04
(52) U.S. Cl. .................. 415/191; 415/209.2; 415/214.1
(58) Field of Search .............................. 415/191, 213.1, 415/214.1, 209.2; 277/641, 644, 653, 654

(56) References Cited

U.S. PATENT DOCUMENTS

| | | | |
|---|---|---|---|
| 3,788,767 A | * | 1/1974 | Bednarczyk et al. ...... 415/209.4 |
| 5,301,595 A | | 4/1994 | Kessie |
| 5,657,998 A | | 8/1997 | Dinc et al. |
| 5,772,401 A | * | 6/1998 | Canova ...................... 415/189 |
| 6,039,325 A | | 3/2000 | Steinetz et al. |
| 6,655,913 B2 | * | 12/2003 | Vedantam et al. ........ 415/214.1 |

* cited by examiner

Primary Examiner—Ninh H. Nguyen
(74) Attorney, Agent, or Firm—Nixon & Vanderhye

(57) ABSTRACT

Upper and lower diaphragms of a steam turbine have mating flanges forming a horizontal midline joint interface. Each flange has a groove which registers with a corresponding groove in the opposite flange. A composite woven tubular seal is provided in the mating grooves. The seal comprises an inner woven metal core surrounded by an annular silica fiber layer, in turn surrounded by a metal foil with an outer protective covering of a braided stainless steel. Upon joining the diaphragms to one another, the compliant seal generally conforms to a maximum to the shape of the grooves, maintaining a seal between the diaphragms along the horizontal midline joint.

18 Claims, 3 Drawing Sheets

COMPOSITE TUBULAR WOVEN SEAL FOR STEAM TURBINE DIAPHRAGM HORIZONTAL JOINT INTERFACES

BACKGROUND OF THE INVENTION

The present invention relates to steam turbines having seals at the horizontal midline joint between upper and lower diaphragms and particularly relates to a composite tubular woven seal for disposition between the upper and lower diaphragms, sealing the path within the diaphragms and confining the steam within the steam path.

Steam turbines typically have upper and lower diaphragms having flanges at a horizontal midline joint with seals at that location for sealing between the diaphragms. Staked keys are conventionally used at the horizontal midline joint interfaces to effect the seal therebetween. These types of metal seals typically include registering slots in the midline flanges of the upper and lower diaphragms and one or more keys extending in the slots sealing between the diaphragms. The staked keys are rigid, elongated elements formed of metal which rely on tight fits in the slots of the upper and lower diaphragms for sealing effectiveness. With these tight fits, the staked keys can often bind during assembly of the diaphragms to one another, resulting in slightly open, horizontal joints at the diaphragm interfaces, and steam leakage paths. For unbolted diaphragm assemblies, these gaps have been measured as great as 5 to 10 mils. Tight fits at the keys can also drive upper to lower axial steam face mismatches, also creating circumferential leakage paths at the steam interfaces. Because the staked keys are linear elements, sealing across a non-linear leak path requires a series of discrete keys with gaps between the keys, creating additional leakage paths. In general, mismatches between the keys and the slots resulting from a number of different causes, including manufacturing variations, have led to significant steam leakage at the diaphragm interface, with reduced machine performance. Accordingly, there is a need for an improved sealing system for the diaphragms of steam turbines at their horizontal midline joint.

BRIEF DESCRIPTION OF THE INVENTION

In accordance with a preferred embodiment of the present invention, there is provided a steam turbine having upper and lower diaphragms, each having a horizontal flange for registration with one another and between which a composite woven tubular seal is disposed for sealing between the diaphragms. The seal is wholly compliant in nature and does not interfere with the mating of the diaphragm flanges. Also, when compressed, the seal deforms to the shape of the slot to block potential leakage paths. The seal also has flexibility to enable the seal to form different geometries of seal as necessary.

Particularly, the tubular woven seal includes an inner woven metal core, a fiber material, a metallic foil and a metal outer covering. Preferably, the inner metal core is formed of a woven stainless steel which is surrounded by silica fiber. The fiber, in turn, is surrounded by a stainless steel metal foil and the outer cover is formed of a braided material, for example, Haynes 188. Because of the resiliency of the metal core and surrounding silica fiber, the woven seal is compliant. Additionally, the metal foil layer surrounding the fiber prevents leakage between the margins of the diaphragm flanges along the horizontal midline confining the steam flow along the steam path. The braided outer covering serves as a protective wear surface. The inner metal core and silica fibers tend to retain their generally circular configuration in cross-section such that the seal, when compressed between the margins of the diaphragm flanges, is preloaded or biased for return to its circular cross-sectional configuration. Thus, any leakage flow through gaps otherwise formed at the horizontal midline of the diaphragms during steam turbine operations are sealed by the composite tubular woven seal.

In a preferred embodiment according to the present invention, there is provided a steam turbine comprising an outer shell, an inner casing within the outer shell and including upper and lower diaphragms adjoining one another along a horizontal joint midline, the upper and lower diaphragms having registering flanges at the joint midline and grooves in the flanges in registration with one another and a compliant seal partially disposed in each of the registering grooves including a seal body formed of multiple layers of different materials for compliantly sealing the registering flanges of the upper and lower diaphragms to one another along the horizontal joint midline.

In a further preferred embodiment according to the present invention, there is provided a steam turbine comprising a rotor including a plurality of circumferentially spaced buckets, an outer shell surrounding the rotor, an inner casing within the outer shell and including upper and lower diaphragms carrying a plurality of stator blades forming with the buckets a stage of the turbine in part defining a steam flowpath through the turbines, the upper and lower diaphragms adjoining one another along a horizontal joint midline and having registering flanges at the joint midline and grooves in the flanges in registration with one another, the grooves disposed radially outwardly of the flowpath and a compliant seal partially disposed in each of the registering grooves including a seal body formed of multiple layers of different materials for compliantly sealing the registering flanges of the upper and lower diaphragms to one another along the horizontal joint midline.

DETAILED DESCRIPTION OF THE INVENTION

Figure 1:
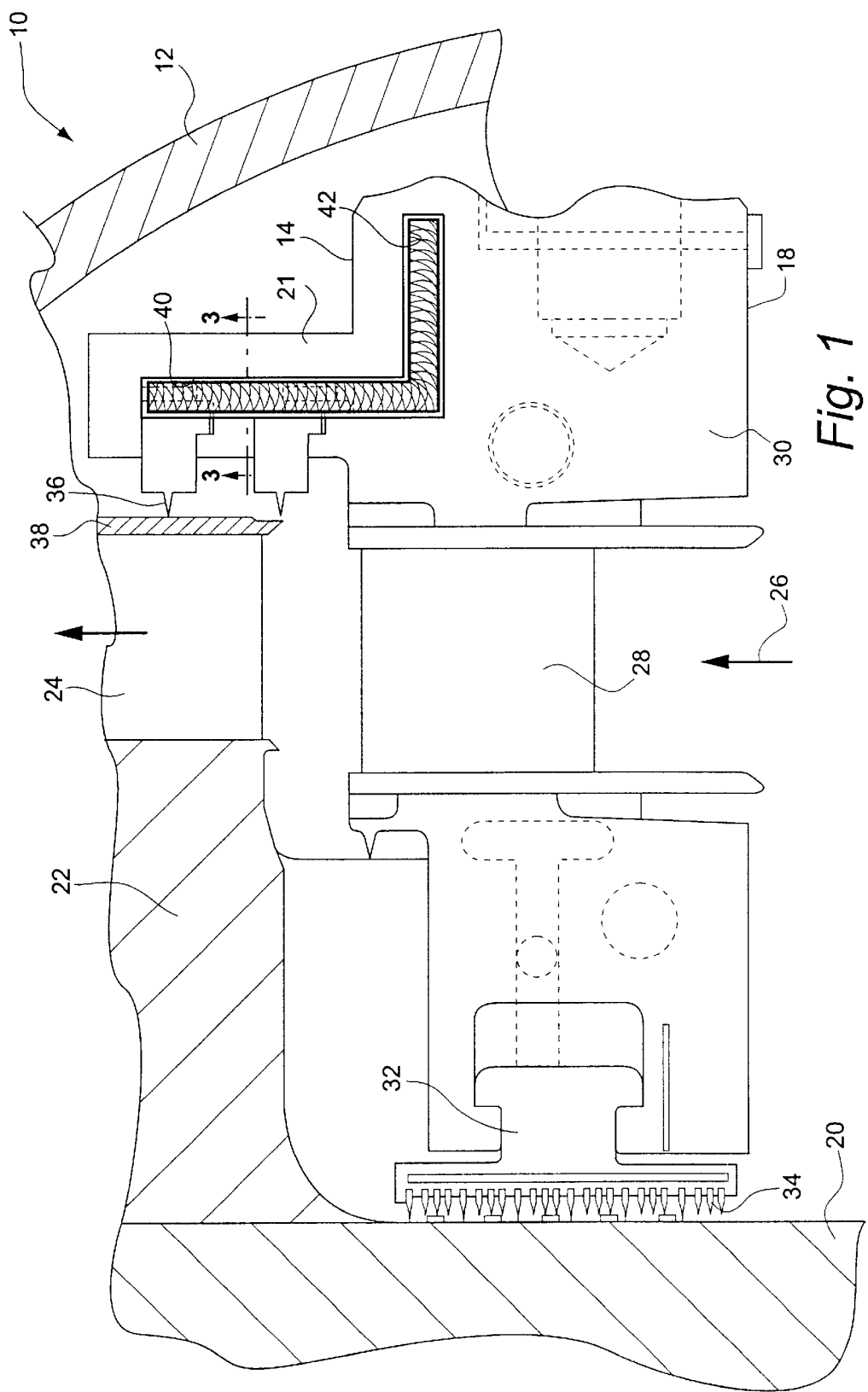
FIG. 1 is a fragmentary cross-sectional view along one side of a horizontal midline joint between upper and lower diaphragms of a steam turbine.

Referring now to the drawings, particularly to FIG. 1, there is illustrated a steam turbine, generally designated 10, having an outer shell 12 surrounding an inner casing 14 including upper and lower diaphragms 16 and 18 (FIGS. 1 and 3), only the lower diaphragm being illustrated in FIG. 1. It will be appreciated that the outer shell is likewise formed of upper and lower casings joined to one another at the horizontal midline of the turbine, e.g., by bolts. The upper and lower diaphragms surround a steam turbine rotor 20 having steam turbine wheels, one of which is illustrated at 22 mounting buckets 24. The buckets 24 are mounted in a steam flowpath, generally designated by the arrows 26, which includes flow past a stator blade 28, as illustrated. It will be appreciated that the upper and lower diaphragms 16 and 18 extend approximately 180° and have flanges 19 and 21, respectively, which register one with the other along a horizontal midline joint, a face 30 of the lower diaphragm at the midline being illustrated. As conventional, the diaphragms mount packing ring segments 32 having labyrinth teeth 34 for sealing about the rotor 20. The diaphragms also carry seal teeth 36 for sealing against the covers 38 mounted on the tips of buckets 24. It will be appreciated that the upper and lower diaphragms confine the steam for flow along the steam path 26 and that therefore the horizontal joint between the upper and lower diaphragms at their joint flanges 30 are sealed to preclude steam leakage flow from the steam path 26 into the space between the diaphragms and the outer shell 12.

Figure 3:
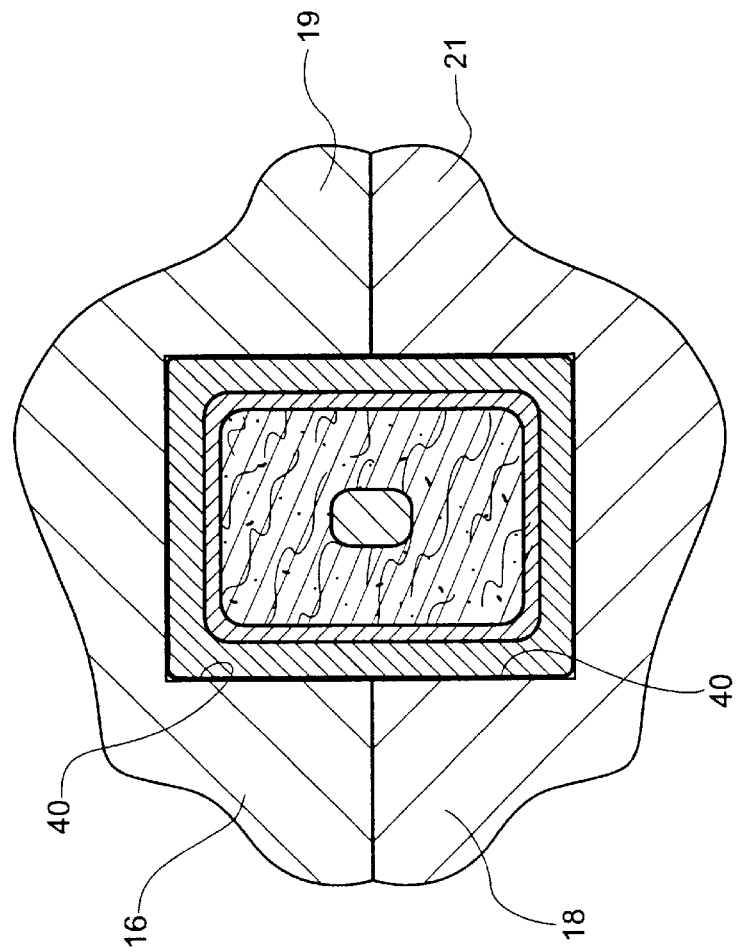
FIG. 3 is a cross-sectional view of the seal of FIG. 2 disposed in the registering grooves of the upper and lower diaphragms, sealing the joint interface.

Instead of staked keys sealing between the flanges 19 and 21 along the horizontal midline joint and at opposite sides of the diaphragms as in prior steam turbine constructions, the present invention employs a composite tubular woven seal, generally designated 43, for sealing between the flanges of the upper and lower diaphragms. To provide the seal, grooves or slots 40 and 42 are formed along the registering faces 30 of the flanges 19 and 21 of the upper and lower diaphragms, respectively. As illustrated in FIG. 3, the grooves are generally rectilinear in cross-section. As illustrated in FIG. 1, the groove 40 extends generally parallel to the axis of rotation of rotor 20, while the groove 42 extends in a generally radial direction.

Figure 4:
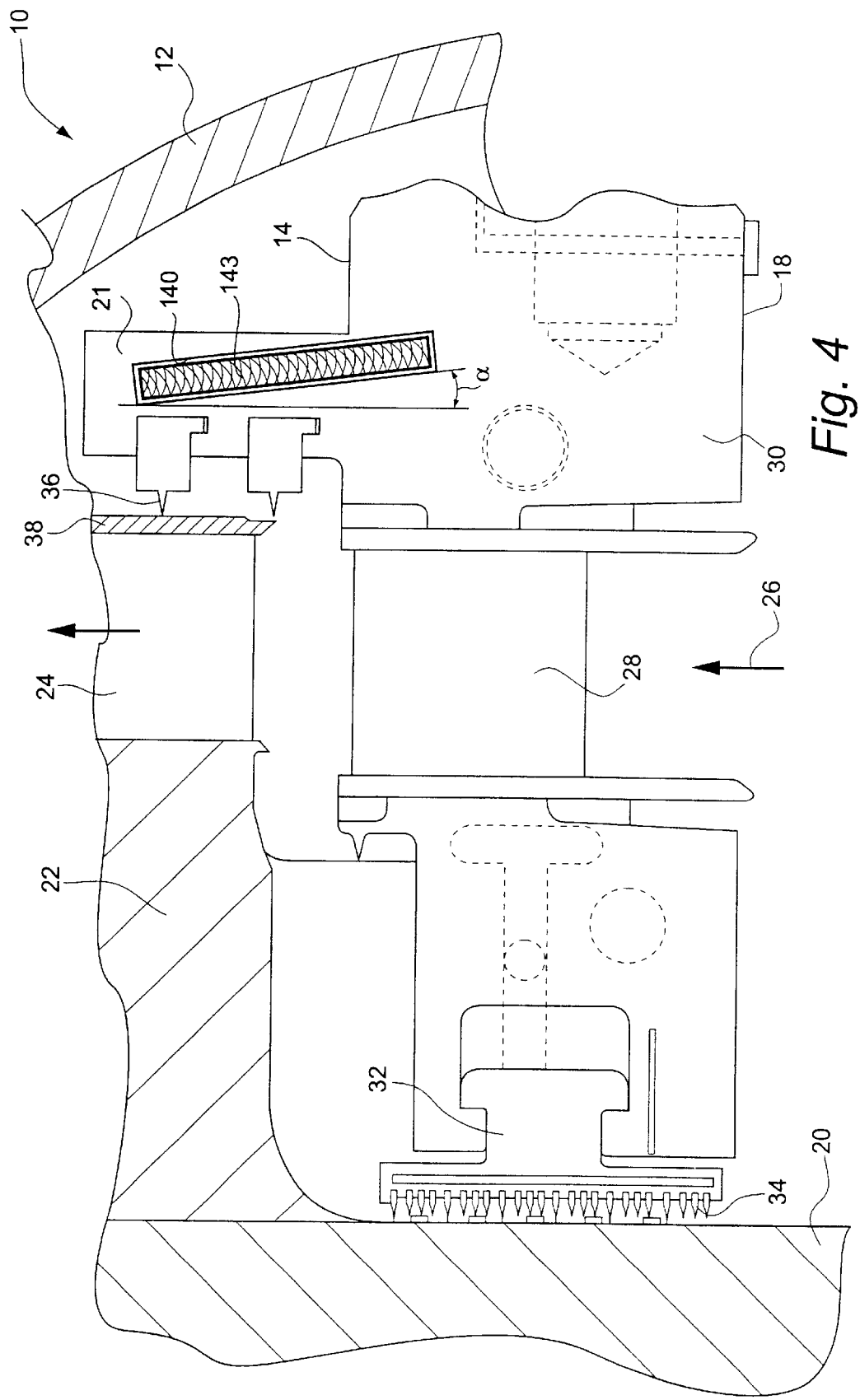
FIG. 4 is a view similar to FIG. 1 illustrating a further configuration of a groove and seal hereof.

As illustrated in FIG. 4, seals and grooves, however, could be slanted, i.e., extend in a direction having both radial and axial directional components relative to the axis of rotation of the turbine. Thus, the groove 140 and seal 143 extend linearly and form an acute angle α with the axis of rotation of the rotor.

Figure 2:
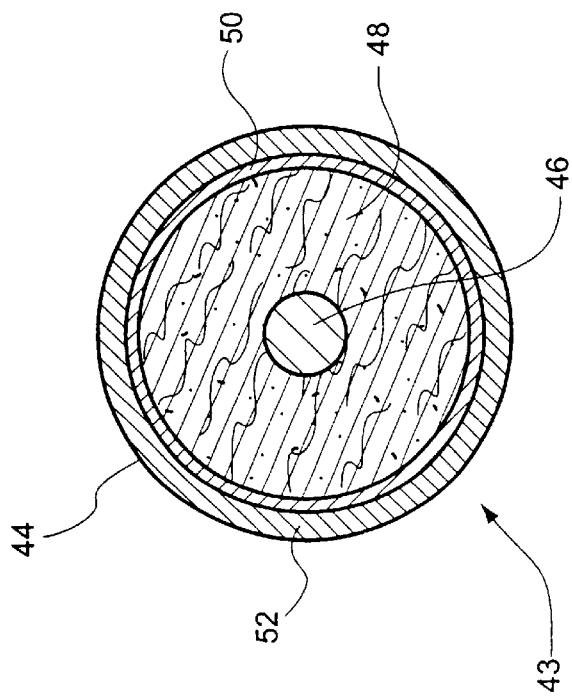
FIG. 2 is an enlarged cross-sectional view of a composite tubular woven seal.

As best illustrated in FIG. 2, the seal 43 includes a seal body 44 having in an uncompressed condition a generally circular configuration in cross-section. Seal body 44 is formed of multiple layers of material. Preferably, the innermost layer comprises a woven metal core 46 formed of a stainless steel material. Surrounding the metal core 46 is an annular layer of fiber 48, preferably a silica fiber 48. Surrounding the silica fiber 48 is a metal foil 50, preferably formed of stainless steel. Finally, the outer covering for the seal body 44 includes a metallic braided material 52, preferably a braided steel material such as Haynes 188. The composite tubular woven seal is compliant in a lateral direction, i.e., is biased or preloaded to return to its circular cross-sectional shape in the event of compression.

Upon a comparison of FIGS. 2 and 3, it will be appreciated that the grooves 40 and 42 formed in each of the upper and lower diaphragms each have a width corresponding generally to the diameter of the seal body 44. However, the depth of each groove 40 and 42 is short of, i.e., less than, the diameter of the seal body 44. Consequently, upon installation of the seal body 44, the composite tubular woven seal projects above the face of the flange of the diaphragm. Upon registering the flanges of the diaphragms one with the other, the compliant nature of the seal enables the seal to deform in a cross-sectional configuration to substantially fill the grooves in the upper and lower diaphragms. That is, as the diaphragm flanges move toward one another into facing contact, the seal body 44 is compliantly compressed to substantially fill the volume of the registering grooves. Thus, a surface portion of the elongated crushed seal body 44 lies in continuous engagement with the margin of the grooves to form seals therewith. In the event of any misalignment between the grooves of the diaphragm flanges, the compliant nature of the seal also enables the seal to continuously seal between the diaphragm halves to minimize or prevent leakage paths at the horizontal midline joint. It will also be appreciated that there may be only one groove on one of the flanges with the seal hereof in the one groove and sealing against an opposite surface of the opposite flange.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A steam turbine comprising:
    an outer shell;
    an inner casing within said outer shell and including upper and lower diaphragms adjoining one another along a horizontal joint midline, the upper and lower diaphragms having registering flanges at the joint midline and grooves in the flanges in registration with one another; and
    a compliant seal partially disposed in each of the registering grooves including a seal body formed of multiple layers of different materials for compliantly sealing the registering flanges of the upper and lower diaphragms to one another along the horizontal joint midline.

2. A steam turbine according to claim 1 wherein said materials of said seal body comprise a woven metal core, a fiber, a metallic foil and a protective layer.

3. A steam turbine according to claim 1 wherein said materials of said seal body comprise an inner woven metal core, a silica fiber, a metallic foil and a braided metal outer protective layer.

4. A steam turbine according to claim 1 wherein each of said grooves has a generally rectilinear cross-section, said compliant seal in an uncompressed condition having a generally circular cross-section, said seal substantially compliantly filling said groove upon securement of said upper and lower diaphragms to one another.

5. A steam turbine according to claim 4 wherein said materials of said seal body comprise a woven metal core, a fiber, a metallic foil and a protective layer.

6. A steam turbine according to claim 1 wherein said materials of said seal body comprise an inner woven metal core, a silica fiber, a metallic foil and a braided metal outer protective layer.

7. A steam turbine according to claim 1 wherein said seal extends in a generally axial direction to seal between the steam flowpath within the diaphragms and a space between the diaphragms and the outer shell.

8. A steam turbine according to claim 1 wherein said seal extends generally radially relative to a rotational axis of a rotor in the steam turbine.

9. A steam turbine according to claim 1 wherein said seal extends in a slanted direction relative to a rotatable axis of a rotor in the steam turbine.

10. A steam turbine comprising:
    a rotor including a plurality of circumferentially spaced buckets;
    an outer shell surrounding said rotor;
    an inner casing within said outer shell and including upper and lower diaphragms carrying a plurality of stator blades forming with said buckets a stage of the turbine in part defining a steam flowpath through the turbines, said upper and lower diaphragms adjoining one another along a horizontal joint midline and having registering flanges at the joint midline and grooves in the flanges in registration with one another, said grooves disposed radially outwardly of the flowpath; and a compliant seal partially disposed in each of the registering grooves including a seal body formed of multiple layers of different materials for compliantly sealing the registering flanges of the upper and lower diaphragms to one another along the horizontal joint midline.

11. A steam turbine according to claim 10 wherein said materials of said seal body comprise a woven metal core, a fiber, a metallic foil and a protective layer.

12. A steam turbine according to claim 10 wherein said materials of said seal body comprise an inner woven metal core, a silica fiber, a metallic foil and a braided metal outer protective layer.

13. A steam turbine according to claim 12 wherein said materials of said seal body comprise an inner woven metal core, a silica fiber, a metallic foil and a braided metal outer protective layer.

14. A steam turbine according to claim 12 wherein said seal extends in a generally axial direction to seal between the steam flowpath within the diaphragms and a space between the diaphragms and the outer shell.

15. A steam turbine according to claim 12 wherein said seal extends generally radially relative to a rotational axis of said rotor in the steam turbine.

16. A steam turbine according to claim 12 wherein said seal extends in a slanted direction relative to a rotatable axis of a rotor in the steam turbine.

17. A steam turbine according to claim 10 wherein each of said grooves has a generally rectilinear cross-section, said compliant seal in an uncompressed condition having a generally circular cross-section, said seal substantially compliantly filling said groove upon securement of said upper and lower diaphragms to one another.

18. A steam turbine according to claim 17 wherein said materials of said seal body comprise a woven metal core, a fiber, a metallic foil and a protective layer.

* * * * *